United States Patent [19]

Katz

[11] Patent Number: 4,574,381

[45] Date of Patent: Mar. 4, 1986

[54] APPARATUS FOR ESTABLISHING AND MAINTAINING A STABLE DISCHARGE ACROSS A STREAM OF FLOWING GAS, PARTICULARLY USEFUL FOR HIGH-POWER LASERS

[75] Inventor: David Katz, Tel Aviv, Israel

[73] Assignee: Metalworking Lasers International Ltd., Neve Sharett, Israel

[21] Appl. No.: 431,253

[22] Filed: Sep. 30, 1982

[51] Int. Cl.$^4$ .............................................. H01S 3/097
[52] U.S. Cl. ......................................... 372/87; 372/83
[58] Field of Search ...................... 372/83, 87, 86, 85, 372/82

[56] References Cited

U.S. PATENT DOCUMENTS

| 3,696,307 | 9/1972 | Beaulieu et al. | 372/83 |
| 3,782,712 | 12/1973 | Judd | 372/87 |
| 3,886,479 | 5/1975 | Pearson | 372/87 |
| 3,940,710 | 2/1976 | Lemay | 372/83 |
| 4,143,337 | 3/1979 | Beaulieu | 372/83 |

OTHER PUBLICATIONS

Tulip et al., "High-Repetition Rate TEA Laser Discharge Using Integrated Preionization and Switching"; IEEE J. Quant Electron. vol. QE-12 No. 2, Feb. 1976 pp. 155-159.

Primary Examiner—William L. Sikes
Assistant Examiner—Léon Scott, Jr.
Attorney, Agent, or Firm—Benjamin J. Barish

[57] ABSTRACT

Apparatus for establishing and maintaining a stable discharge across a stream of flowing gas, particularly useful for high-power lasers, comprises working electrodes disposed on opposite sides of the gas flow channel, and starting electrodes adjacent to the upstream working electrodes. Each working electrode includes a ballast impedance and is connected between a high-voltage source and a point of fixed reference potential. Each starting electrode includes a substantially larger ballast impedance and is connected to the point of fixed reference potential such that each starting electrode is effective to bring the point of fixed reference potential to the upstream working electrode to start the discharge, and to draw little current after the discharge has been started.

8 Claims, 5 Drawing Figures

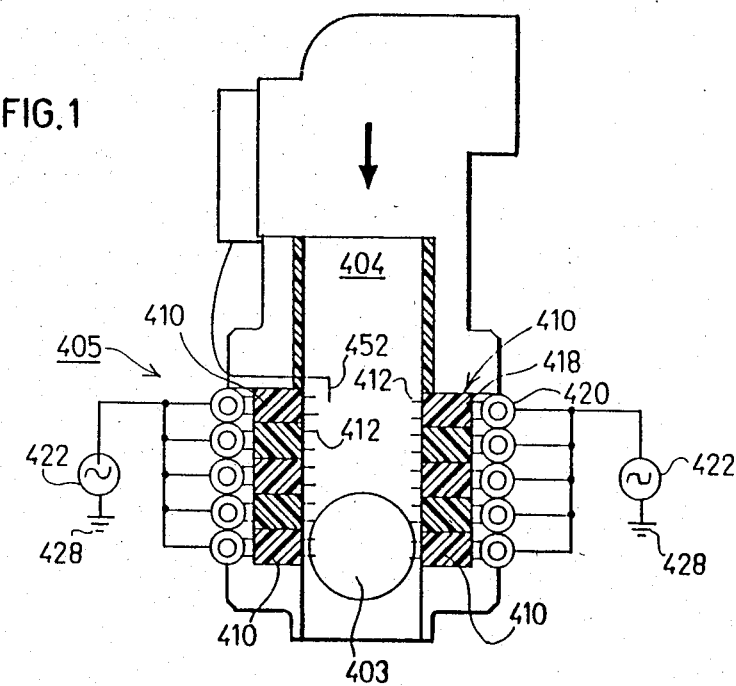
FIG. 1
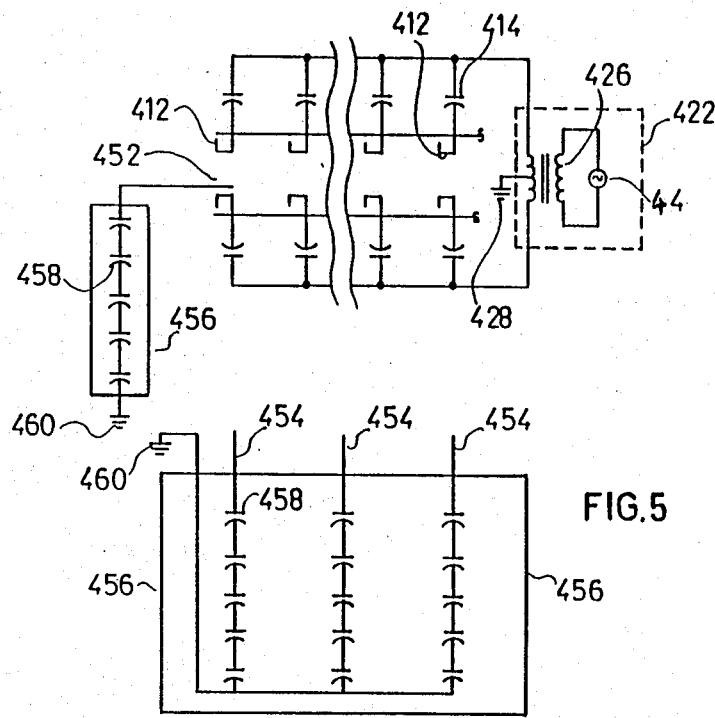
FIG. 4
FIG. 5

APPARATUS FOR ESTABLISHING AND MAINTAINING A STABLE DISCHARGE ACROSS A STREAM OF FLOWING GAS, PARTICULARLY USEFUL FOR HIGH-POWER LASERS

RELATED APPLICATIONS

The present application is related to pending applications Ser. No. 410,594 filed Aug. 23, 1982, now U.S. Pat. No. 4,486,887 of Dec. 4, 1984 by Ethan D. Hoag and Glen W. Zeiders; Ser. No. 431,014 filed Sept. 30, 1982 by Ethan D. Hoag; Ser. No. 431,252 filed Sept. 30, 1982 by Jacob Daniel; and Ser. No. 431,254 filed Sept. 30, 1982 by Ethan D. Hoag all assigned to the same assignee as the present application.

BACKGROUND OF THE INVENTION

The present invention relates to apparatus for establishing and maintaining a stable discharge across a stream of gas flowing through a gas-flow channel. The invention is particularly applicable to high-power flowing-gas lasers, and is therefore described below with respect to such application.

There has been considerable activity in recent years to produce high-power flowing-gas lasers for use particularly in the metalworking industries. Examples of some of the known lasers of this type are described in U.S. Pat. Nos. 3,641,457; 3,702,973; 3,748,594; 3,758,874; 3,886,481; 3,021,098; 4,058,778; 4,317,090; and 4,321,558. One of the main problems in the design of such high-power lasers is the dissipation of the heat, since power lasers cannot operate efficiently at unduly high temperatures; for example, the $CO_2$ laser, which is the one mainly used today for high power applications, cannot operate efficiently at temperatures much above 200° C. Another problem in the design of high-power lasers is the difficulty in establishing and maintaining a stable electrical discharge across the stream of flowing gas. U.S. Pat. Nos. 3,748,594 and 3,758,874 of those cited above are particularly directed to this problem. It will be appreciated that both of the above problems involved in the construction of high-power flowing-gas lasers are also involved in the design and construction of other high-power flowing-gas electrical devices.

BRIEF SUMMARY OF THE INVENTION

An object of the present invention is to provide improved apparatus for establishing and maintaining a stable electrical discharge across a stream of gas flowing through a gas-flow channel. Another object of the invention is to provide a high-power flowing-gas laser of improved construction in the above respects.

According to a broad aspect of the present invention, there is provided apparatus for establishing and maintaining a stable discharge across a stream of gas flowing through a gas-flow channel, comprising: an electrode system including a group of working electrodes disposed on opposite sides of the gas flow channel and spaced longitudinally thereof in the direction of gas flow, which working electrodes include at least one upstream electrode at the upstream end of the gas flow channel; a high-voltage alternating current source connected at one side to each of the working electrodes and at the opposite side to a point of fixed reference potential; and a ballast impedance connected to each of the working electrodes for stabilizing the electrical discharge; the electrode system further including at least one starting electrode adjacent to the upstream working electrode and connected to the point of fixed reference potential via a ballast impedance of substantially larger impedance value than those connected to the working electrodes, such that the starting electrode is effective to bring the point of fixed reference potential to the upstream working electrode to start the discharge, and to draw little current after the discharge has been started.

In the preferred embodiment of the invention described below, the point of fixed reference potential is ground; the high-voltage source is high-frequency alternating current; and the ballast impedances are capacitors.

Further features and advantages of the invention will be apparent from the description below.

BRIEF DESCRIPTION OF THE DRAWINGS

The invention as herein described, by way of example only, with reference to the accompanying drawings, wherein:

FIG. 1 is a side elevational view, partially broken away to show internal structure, of one form of laser structure constructed in accordance with the present invention;

FIG. 4 is a diagram illustrating the equivalent excitation circuit in the laser structure of FIGS. 1-3; and FIG. 5 is a diagram illustrating the equivalent circuit of ballast impedances provided for the starter electrodes in the diagram of FIG. 4.

DESCRIPTION OF A PREFERRED EMBODIMENT

Figure 2:
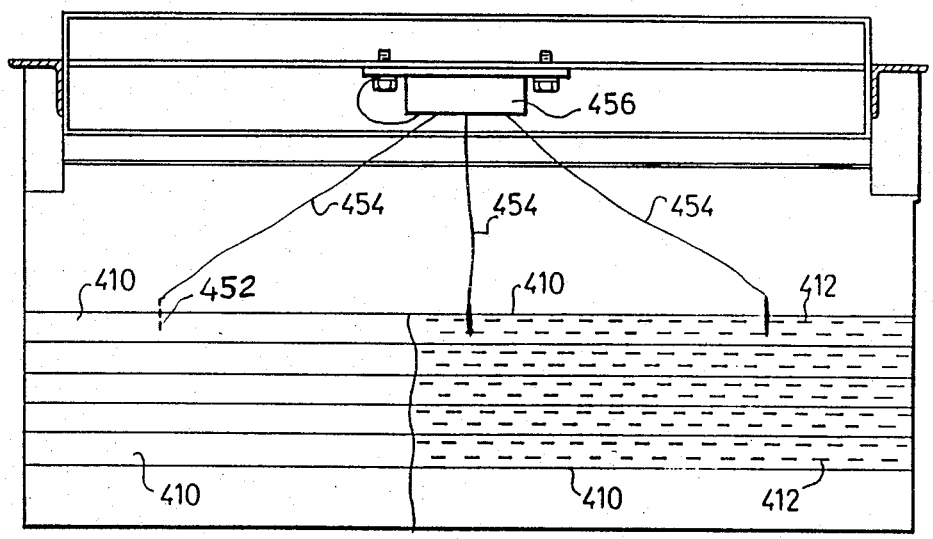
FIGS. 2 and 3 are top and end views respectively, also partially broken away to show internal structure, of the laser structure illustrated in FIG. 1.

The apparatus shown in the drawings for purposes of illustrating the present invention is one of the laser channel legs in the laser constructed in accordance with the above-cited copending patent application Ser. No. 410,594, now U.S. Pat. No. 4,486,887. The laser channel leg is schematically shown at 403 in FIG. 1 and is at the inner end of a gas-flow channel 404 through which the laser gas, such as a $CO_2$ mixture, is circulated so as to flow transversely through the laser channel leg 403. An electrical discharge system, generally designated 405, is provided upstream of the laser channel leg 403 for exciting the gas and for producing the required population inversion.

The electrical discharge system 405 is constituted of a plurality of modular elements 410 spaced along the length of each side of the gas flow channel 404. Each of the modular elements 410 includes a plurality of electrodes 412 disposed in two staggered lines (FIG. 2), each line extending transversely of the path of gas flow through channel 404. Each modular element 410 further includes a ballast capacitor 414 (FIG. 4) for each electrode 412, with all the electrodes and ballast capacitors of each modular element 410 embedded within a plastic material 418. Each modular element 410 further includes a water-conducting tube 420 for removing the heat generated within the module; tubes 420 are made of metal, i.e., copper, and are also used for electrically connecting the power supply 422 to the electrodes 412.

Further details of the construction and operation of the illustrated laser channel leg are set forth in the above-cited copending patent application Ser. No. 410,594, now U.S. Pat. No. 4,486,887.

As shown in FIG. 4, the power supply 422 includes a high-frequency voltage source 42 coupled by a transformer 426 to all the electrodes 412 within the modular elements 410, this electrical connection being via the external water-conducting tubes 420 and the ballast capacitors 414 as mentioned above. The opposite sides of the secondary winding of transformer 426 are connected to the electrodes 412 in the two groups of modular elements 410 lining the two opposed sides of the gas flow channel 404, the midpoint of the transformer secondary winding being connected to a point of fixed reference potential, in this case ground, as shown at 428 in FIG. 4.

The electrode system as illustrated in the drawings further include a plurality of starting electrodes, designated 452, each adjacent to one of the electrodes 412 at the upstream side of the gas flow channel 404. As described above, electrodes 412, which are embedded within the modular elements 410, are used for exciting the laser gas within the channel 404, and are therefore hereinafter called working electrodes to distinguish from electrodes 452 which are used only for starting the electrical discharge.

Figure 3:
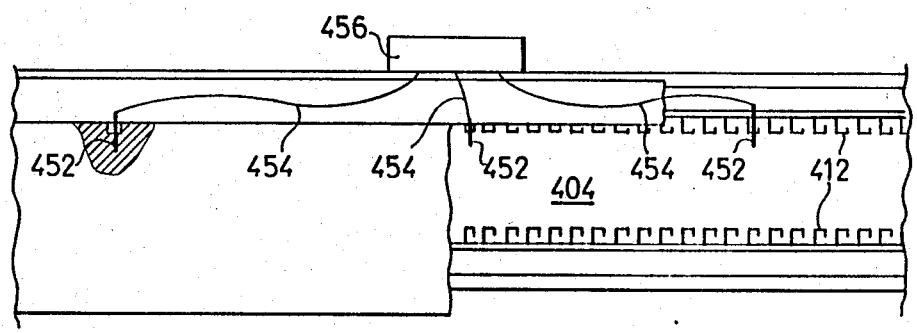

Thus, as shown particularly in FIGS. 2 and 3, three such starting electrodes 452 are provided, one near each of the two opposite ends of the upstream module 410, and one at an intermediate point of the upstream module. In the illustrated construction, starting electrodes 452 are provided adjacent to the working electrodes of only the upstream modular element 410 on one side of the gas flow channel 404, it having been found that this is sufficient to start the electrical discharge; however, it will be appreciated that starting electrodes 452 could be provided adjacent to the working electrodes on both sides of the channel 404.

As shown particularly in FIG. 3, each of the working electrodes 412 is constituted of a metal pin protruding into the gas flow channel and includes a leg within the channel extending transversely to the direction of the gas flow therethrough. Each of the starting electrodes 452 is also constituted of a metal pin closely spaced to one of the working electrodes in the upstream module 410 and extends transversely to its leg, i.e., parallel to the direction of gas flow through the channel (FIG. 1).

All three of the starting electrodes 452 are connected, via conductors 454, to a block of insulating material 456 embedding a plurality of ballast capacitors 458. As shown in FIGS. 4 and 5, each of the starting electrodes 452 is electrically connected via its conductor 454 to one side of five capacitors 458 connected in series, the opposite side of the capacitors being connected to ground as shown at 460. Thus, block 456 includes 15 capacitors, namely five capacitors connected in series for each of the three starting electrodes 452.

Each of the capacitors 458 for the starting electrodes 454 may have an impedance equal to the capacitors 414 for the working electrodes 412. Thus, since each starting electrode 452 includes five such capacitors connected in series, the ballast impedance connected to each of the starter electrodes 452 is substantially greater than the ballast impedance connected to each of the working electrodes 412.

The illustrated electrical discharge system operates as follows: During each cycle of the input voltage 424 applied by transformer 426, and before a discharge is produced across the working electrodes 412 in the gas flow channel 404, the three starting electrodes 452 are effective to bring the point of fixed reference potential (namely ground 460) to the three upstream working electrodes 412 adjacent to the three starting electrodes 452. This facilitates the starting of the electrical discharge with respect to these upstream working electrodes. The discharge, once started, spreads quickly by the flow of the gas to the downstream working electrodes 412. As soon as the discharge is produced, the high impedance of the starting electrodes 452, as provided by their respective capacitors 458, causes them to draw very little current, thereby minimizing the power consumed by the starter electrodes and also obviating the need to cool them.

As one example, each capacitor 414 for each of the working electrodes 412 may be of 500 pF, and each of the five capacitors 458 for each of the starter electrodes 452 may have the same value, such that the impedance connected to each of the starter electrodes is five times that connected to each of the working electrodes. The power supply 424 may be 150 kW, 1200 volt (RMS), 10 kHz.

While the invention has been described with respect to one preferred embodiment, it will be appreciated that many other variations, modifications and applications of the invention may be made.

What is claimed is:

1. Apparatus for establishing and maintaining a stable discharge across a stream of gas flowing through a gas-flow channel, comprising:
    an electrode system including a group of working electrodes disposed on opposite sides of the gas flow channel and spaced longitudinally thereof in the direction of gas flow, which working electrodes include at least one upstream electrode at the upstream end of the gas flow channel;
    a high-voltage alternating current source connected at one side to each of said working electrodes and at the opposite side to a point of fixed reference potential;
    and a ballast impedance connected to each of said working electrodes for stabilizing the electrical discharge;
    said electrode system further including at least one starting electrode adjacent to said upstream working electrode and connected to said point of fixed reference potential via a ballast impedance of substantially larger impedance value than those connected to said working electrodes, such that said starting electrode is effective to bring the point of fixed reference potential to the upstream working electrode to start the discharge, and to draw little current after the discharge has been started.

2. The apparatus according to claim 1, wherein said point of fixed reference potential is ground.

3. The apparatus according to claim 1, wherein said high-voltage source is of high-frequency alternating current, and said ballast impedances are capacitors.

4. The apparatus according to claim 1, wherein each of said working electrodes is constituted of a metal pin protruding into the gas flow channel and including a leg within the gas flow channel extending transversely to the direction of the gas flow therethrough, and wherein said starting electrode is constituted of a metal pin closely spaced to said upstream working electrode and extending transversely to said leg thereof and parallel to the direction of gas flow through the channel.

5. The apparatus according to claim 1, wherein said working electrodes are disposed in a plurality of lines each extending transversely across the gas flow channel, there being one of said starting electrodes adjacent to a working electrode at each of the two ends of the line of working electrodes at the upstream side of said channel.

6. Apparatus according to claim 5, wherein said group of working electrodes includes a further starting electrode adjacent to the working electrode at the middle of the line of working electrodes at the upstream side of said channel.

7. Apparatus according to claim 5, wherein said working electrodes are disposed in a plurality of modular elements each extending transversely of the gas flow channel, each of said modular elements including at least one line of said working electrodes embedded within a block of insulating material and extending along the respective portion of the wall of the gas flow channel, said starting electrodes being embedded in the modular element at the upstream end of the gas flow channel.

8. Apparatus according to claim 7, wherein the ballast impedance for each working electrode is also embedded in its respective module, the ballast impedances for all the starting electrodes being embedded within a common block of insulating material.

* * * * *